United States Patent
Sato et al.

(10) Patent No.: US 12,469,914 B2
(45) Date of Patent: Nov. 11, 2025

(54) LID BODY AND SEALED BATTERY

(71) Applicants: Prime Planet Energy & Solutions, Inc., Tokyo (JP); TOYOTA JIDOSHA KABUSHIKI KAISHA, Aichi-ken (JP)

(72) Inventors: Yuki Sato, Toyota (JP); Yozo Uchida, Toyota (JP); Hideki Asadachi, Toyota (JP); Syoichi Tsuchiya, Toyota (JP); Masataka Asai, Toyota (JP); Tsuyoshi Asano, Toyota (JP); Masahiro Uchimura, Toyota (JP); Nozomi Tateyama, Okazaki (JP)

(73) Assignees: PRIME PLANET ENERGY & SOLUTIONS, INC., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 325 days.

(21) Appl. No.: 17/561,749

(22) Filed: Dec. 24, 2021

(65) Prior Publication Data

US 2022/0209345 A1    Jun. 30, 2022

(30) Foreign Application Priority Data

Dec. 28, 2020 (JP) ................................. 2020-218808

(51) Int. Cl.
*H01M 50/195* (2021.01)
*H01M 10/0525* (2010.01)
(Continued)

(52) U.S. Cl.
CPC ..... *H01M 50/195* (2021.01); *H01M 10/0525* (2013.01); *H01M 50/147* (2021.01); *H01M 50/188* (2021.01); *H01M 50/547* (2021.01)

(58) Field of Classification Search
CPC ............. H01M 50/147; H01M 50/188; H01M 50/195; H01M 50/193

See application file for complete search history.

(56) References Cited

U.S. PATENT DOCUMENTS

| | | | |
|---|---|---|---|
| 10,658,632 B1 * | 5/2020 | Zeng | H01M 50/159 |
| 2002/0177027 A1 * | 11/2002 | Yeager | H01M 8/0221 |
| | | | 252/511 |

(Continued)

FOREIGN PATENT DOCUMENTS

| | | |
|---|---|---|
| CN | 102610769 A | 7/2012 |
| JP | H350277 A | 3/1991 |

(Continued)

OTHER PUBLICATIONS

Machine translation of JP-5185116-B2 from PE2E (Year: 2013).*
Machine translation of JP2012131896A from espacenet (Year: 2012).*

*Primary Examiner* — Nicholas A Smith
*Assistant Examiner* — Zackary Richard Cochenour
(74) *Attorney, Agent, or Firm* — HAUPTMAN HAM, LLP

(57) ABSTRACT

A lid body includes a terminal member of at least one of a positive electrode and a negative electrode, a sealing plate including an attachment hole for attaching the terminal member, and a sealing material containing a thermoplastic resin and an inorganic filler. The terminal member is inserted into the attachment hole and attached to the sealing plate in a state in which the sealing material is joined to a peripheral portion of the attachment hole. Here, as the inorganic filler, an inorganic substance having a volume change rate of 20% or less after being immersed for 7 days in a test electrolyte, which is prepared at 65° C., and which contains 1200 ppm of water and 1 M of $LiPF_6$, and moreover in which a volume ratio of a solvent thereof satisfies a relationship of ethylene carbonate:diethyl carbonate:dimethyl carbonate=1:1:1, is used.

12 Claims, 1 Drawing Sheet

(51) Int. Cl.
*H01M 50/147* (2021.01)
*H01M 50/188* (2021.01)
*H01M 50/547* (2021.01)

(56) References Cited

U.S. PATENT DOCUMENTS

| | | | | |
|---|---|---|---|---|
| 2005/0130024 | A1* | 6/2005 | Otsuki | H01M 8/1025 |
| | | | | 252/500 |
| 2012/0189906 | A1 | 7/2012 | Nakajima et al. | |
| 2012/0308877 | A1* | 12/2012 | Hirai | H01M 50/55 |
| | | | | 429/184 |
| 2014/0065472 | A1* | 3/2014 | Naritomi | H01M 50/193 |
| | | | | 428/141 |
| 2018/0212208 | A1* | 7/2018 | Kim | H01M 10/613 |
| 2019/0013498 | A1 | 1/2019 | Maeda | |
| 2019/0044107 | A1* | 2/2019 | Ito | H01M 50/193 |
| 2020/0013998 | A1* | 1/2020 | Shin | H01M 50/186 |

FOREIGN PATENT DOCUMENTS

| | | | | | |
|---|---|---|---|---|---|
| JP | 2008-027849 | A | 2/2008 | | |
| JP | 200827823 | A | 2/2008 | | |
| JP | 2008311217 | A | 12/2008 | | |
| JP | 2012131896 | A | 7/2012 | | |
| JP | 5185116 | B2 * | 4/2013 | ............ | H01M 10/28 |
| JP | 201644303 | A | 4/2016 | | |
| JP | 6132669 | B2 | 5/2017 | | |
| JP | 2017117560 | A | 6/2017 | | |
| JP | 2019169272 | A | 10/2019 | | |
| JP | 202055205 | A | 4/2020 | | |
| WO | 2017119485 | A1 | 7/2017 | | |

\* cited by examiner

LID BODY AND SEALED BATTERY

BACKGROUND OF THE INVENTION

1. Field of the Invention

The present disclosure relates to a lid body and a sealed battery using the same. More specifically, the present disclosure relates to a lid body including a sealing material and a sealed battery using the same. In addition, priority is claimed on Japanese Patent Application No. 2020-218808, filed Dec. 28, 2020, the entire content of which is incorporated herein by reference.

2. Description of the Related Art

Non-aqueous electrolyte secondary batteries such as a lithium-ion secondary battery are becoming more important as power sources mounted in vehicles or power sources for personal computers, mobile terminals, and the like. In particular, a lithium-ion secondary battery, which is lightweight and has a high energy density, is preferably used as a high output power source mounted in a vehicle.

This type of secondary battery is built as, for example, a sealed battery in which an electrode body is accommodated inside a battery case. A terminal is attached to a lid body of such a sealed battery, with a sealing material being interposed therebetween. For the terminal used for the sealed battery, for example, a terminal having an external terminal exposed to the outside of a battery case and an internal terminal connected to an electrode body inside the battery case is used. The terminal having such a configuration is connected to the lid body by inserting one of the external terminal and the internal terminal into an attachment hole of a sealing plate so as to be subjected to crimping with respect to the other.

The sealing material is required to have a sealing property to keep the inside of the battery case airtight. Further, the sealing material is required to have mechanical strength that can withstand crimping strength when the terminal is attached to the sealing plate by crimping. An inorganic filler is blended in the sealing material in order to improve the mechanical strength of the sealing material.

For example, Japanese Patent Application Laid-open No. 2020-55205 discloses a technique of blending glass fiber into a resin member in order to improve strength and impact resistance of the resin member.

SUMMARY OF THE INVENTION

Until now, mechanical strength that can withstand crimping strength has been emphasized as a property required for a sealing material. However, in recent years, in order to reduce manufacturing costs, attempts have been made to reduce the number of components used in a battery. For example, directly joining a metal terminal or a sealing plate to a sealing material made of a resin material without using a component for joining a terminal by crimping has been studied.

In such a case, there is a concern that an inorganic filler contained in the sealing material may be corroded due to contact between an electrolyte and the sealing material inside a battery case. As the corrosion progresses, there is a concern of decreasing joining strength between the sealing material and the terminal, thereby impairing a sealing property of the sealing material.

Corrosion resistance of an inorganic filler to an electrolyte has not been fully researched yet. An inorganic substance blended in a resin described in Japanese Patent Application Laid-open No. 2020-55205 does not have corrosion resistance to an electrolyte. Although spherical silica and glass beads are blended in a resin described in Japanese Patent No. 6132669 for the purpose of improving chemical resistance, the resin does not have corrosion resistance to an electrolyte used for a lithium-ion secondary battery or the like. For that reason, it is not preferable to apply such a resin as a sealing material to a sealed battery in which a metal terminal or a sealing plate is directly joined to the sealing material from the viewpoint of long-term use of a battery.

There is a demand for a sealing material that can prevent corrosion due to an electrolyte and maintain a sealing property for a long period of time.

The present disclosure has been made in view of the above points, and an object thereof is to provide a lid body in which an inorganic filler having corrosion resistance to an electrolyte is blended in a sealing material, thereby maintaining a joint between a metal member such as a sealing plate or a terminal and a joining surface of the sealing material made of a resin material for a long period of time. In addition, another object thereof is to provide a highly durable sealed battery using such a lid body.

In order to realize the above objects, a lid body disclosed here is a lid body which is used for a sealed battery including a case body including an opening and accommodating an electrode body, and which closes the opening, the lid body including: a terminal member; a sealing plate including an attachment hole for attaching the terminal member; and a sealing material containing a thermoplastic resin and an inorganic filler. The terminal member is attached to the attachment hole in a state of being joined to the sealing material. Here, as the inorganic filler, an inorganic substance having a volume change rate of 20% or less after being immersed for 7 days in a test electrolyte which is prepared at 65° C., and which contains 1200 ppm of water and 1 M of $LiPF_6$, and moreover in which a volume ratio of a solvent thereof satisfies a relationship of ethylene carbonate:diethyl carbonate:dimethyl carbonate=1:1:1, is used.

The inorganic filler, the volume of which is less likely to change, is used for the sealing material of the lid body used for the sealed battery disclosed herein, in particular, even in a case in which it is immersed in the above-mentioned test electrolyte. With such a configuration, the expansion of the inorganic filler in the sealing material is inhibited, and a joining surface between the terminal or the sealing plate and the sealing material is less likely to be peeled off even in a case in which the electrolyte comes into contact with the sealing material. As a result, the sealing property of the sealing material is maintained for a long period of time.

In a preferred aspect, the thermoplastic resin is substantially composed of a polyarylene sulfide resin.

By using polyarylene sulfide, which has excellent adhesion to a metal, as a material of the sealing material, the sealing property of the sealing material is suitably maintained.

In a preferred aspect, the inorganic filler are substantially composed of at least one selected from the group consisting of alumina, potassium titanate, silicon carbide and carbon.

Since these inorganic fillers have particularly high corrosion resistance to the electrolyte, the sealing property of the sealing material is maintained for a longer period of time.

As a preferred embodiment of the technique disclosed herein, at least a portion of the sealing material is joined to a negative electrode terminal by an anchor effect.

In the sealed battery having such a configuration, the stress applied to the joining surface between the sealing material and the negative electrode terminal member is reduced. For that reason, peeling is less likely to occur on the joining surface.

As another aspect of the technique disclosed herein, provided is a sealed battery including: an electrode body including a positive electrode and a negative electrode; a case body that includes an opening and accommodates the electrode body; and the lid body disclosed herein that closes the opening.

DESCRIPTION OF THE PREFERRED EMBODIMENT(S)

Figure 1:
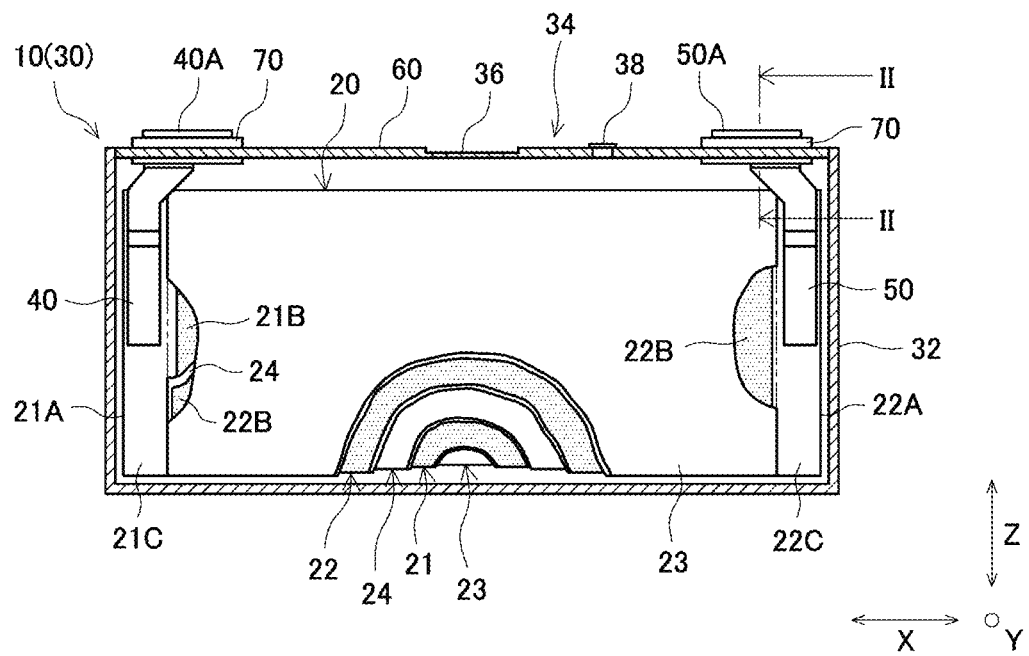
FIG. 1 is a cross-sectional view schematically showing an internal structure of a sealed battery according to an embodiment.

A lid body and a sealed battery disclosed herein will be described in detail below with reference to the figures as appropriate, taking a lithium-ion secondary battery including a wound electrode body as an example. The following embodiments are, of course, not intended to specifically limit the technique disclosed herein.

In addition, matters other than those specifically mentioned in the present specification and required for carrying out the present disclosure can be understood as design matters for those skilled in the art based on conventional techniques in the art. The present disclosure can be carried out on the basis of the content disclosed in the present specification and common technical knowledge in the art.

In the following figures, members and parts that perform the same action are denoted by the same reference numerals, and repeated descriptions thereof may be omitted or simplified. Dimensional relationships such as lengths and widths in the following figures do not necessarily reflect actual dimensional relationships.

In a case in which a numerical range is described as A to B (here, A and B are arbitrary numerical values) in the present specification, it means A or more and B or less. The term "substantially composed of" in the present specification indicates occupying a proportion equal to or more than 95% by weight of constituent components while allowing unavoidable impurities to be mixed in the constituent components.

Figure 2:
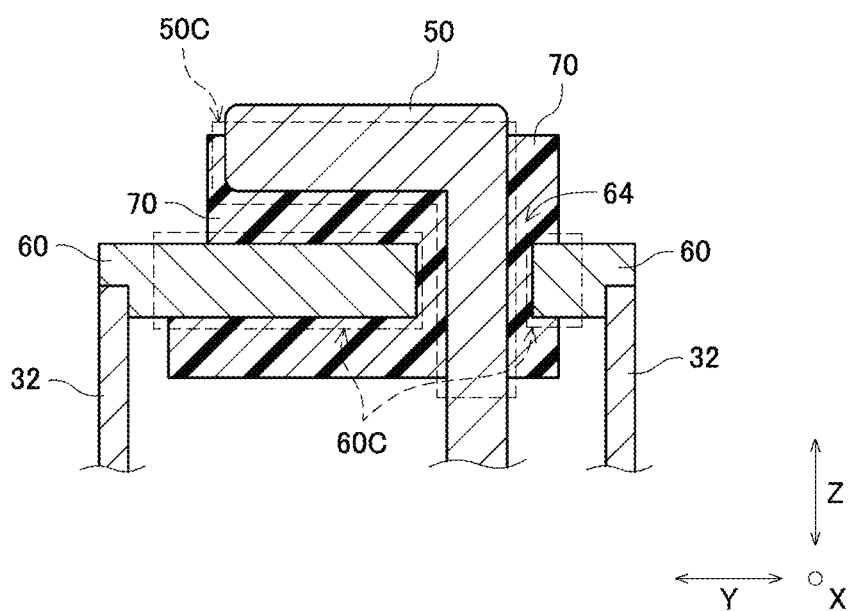
FIG. 2 is a cross-sectional view along line II-II in FIG. 1, which is a partial cross-sectional view schematically showing a structure of a lid body according to an embodiment.

FIG. 1 is a cross-sectional view schematically showing an internal structure of a sealed battery 10 according to the present embodiment. FIG. 2 is a partial cross-sectional view schematically showing a structure of a lid body 34. Also, in the figures of the present specification, reference numeral X indicates a width direction of the sealed battery, reference numeral Y indicates a thickness direction thereof, and reference numeral Z indicates a height direction thereof. These directions are defined for convenience of explanation, and are not intended to limit an installation mode of the battery.

As shown in FIG. 1, the sealed battery 10 according to the present embodiment includes an electrode body 20 and a battery case 30. The electrode body 20 disclosed herein is a power generation element accommodated inside the battery case 30 in a state in which it is covered with an insulating film or the like (not shown). The electrode body 20 is a so-called wound electrode body in which an elongated sheet-shaped positive electrode 21 and an elongated sheet-shaped negative electrode 22 overlap each other with two similarly elongated sheet-shaped separators 23 and 24 interposed therebetween and are wound in flat shapes. The electrode body 20 is accommodated in a battery case body 32 together with a non-aqueous electrolyte (not shown), and peripheral edge portions of the lid body 34 are sealed and hermetically closed by welding or the like while the inside is depressurized.

The positive electrode 21 includes a foil-shaped positive electrode current collector 21A and a positive electrode active material layer 21B formed on one or both surfaces of the positive electrode current collector 21A in a longitudinal direction thereof. Further, one side edge portion of the electrode body 20 in the width direction X is not formed with the positive electrode active material layer 21B and is provided with a positive electrode current collector exposed portion 21C in which the positive electrode current collector 21A is exposed. The positive electrode active material layer 21B contains various materials such as a positive electrode active material, a binder, and a conductive material. In addition, for the materials contained in the positive electrode active material layer 21B, materials that may be used in a conventional general lithium-ion secondary battery can be used without particular limitation, and since they do not characterize the present disclosure, detailed description thereof will be omitted.

The negative electrode 22 includes a foil-shaped negative electrode current collector 22A and a negative electrode active material layer 22B formed on one or both surfaces of the negative electrode current collector 22A in the longitudinal direction. Further, the other side edge portion of the electrode body 20 in the width direction X is not formed with the negative electrode active material layer 22B and is provided with a negative electrode current collector exposed portion 22C in which the negative electrode current collector 22A is exposed. Similarly to the positive electrode active material layer 21B, the negative electrode active material layer 22B contains various materials such as a negative electrode active material and a binder. For the materials contained in the negative electrode active material layer 22B, materials that may be used in a conventional general lithium-ion secondary battery can be used without particular limitation, and since they do not characterize the present disclosure, detailed description thereof will be omitted.

The separators 23 and 24 are interposed between the positive electrode 21 and the negative electrode 22 to prevent these electrodes from coming into direct contact with each other. Although not shown, the separators 23 and 24 are formed with a plurality of fine holes. The fine holes are configured such that charge carriers (lithium ions in the case of a lithium-ion secondary battery) move between the positive electrode 21 and the negative electrode 22.

For the separators 23 and 24, resin sheets having required heat resistance, for example, sheets made of a polyolefin such as polypropylene or polystyrene, or the like are used.

For the non-aqueous electrolyte accommodated in the battery case 30, a non-aqueous electrolyte that typically contains a non-aqueous solvent and a supporting salt and may be used in a conventional general lithium-ion secondary battery can be used without particular limitation, and since it does not characterize the present disclosure, detailed description thereof will be omitted.

The battery case 30 is a container for accommodating the electrode body 20. The battery case 30 in the present embodiment is a flat square container and includes a square case body 32 having an open upper surface and a plate-shaped lid body 34 that closes an opening of the case body 32. The lid body 34 is provided with a thin safety valve 36 set to release an internal pressure of the battery case 30 in a case in which the internal pressure rises to a predetermined level or more. Further, the lid body 34 is provided with a liquid injection port 38 for injecting a non-aqueous electrolyte. A metal material having required strength is used for the case body 32 and the lid body 34, and for example, aluminum, an aluminum alloy, or the like may be used.

The lid body 34 includes a sealing plate 60, a positive electrode terminal member 40, a negative electrode terminal member 50, and a sealing material 70. The sealing plate 60 is a rectangular aluminum plate and includes attachment holes 64 into which the positive electrode terminal member 40 and the negative electrode terminal member 50 are inserted.

The negative electrode terminal member 50 is an elongated metal member extending in the height direction Z. As shown in FIG. 1, a lower end portion of the negative electrode terminal member 50 is connected to the negative electrode current collector exposed portion 22C. As shown in FIG. 2, the negative electrode terminal member 50 passes through the attachment hole 64 and is exposed to the outside of the battery case 30. The portion of the negative electrode terminal member 50 exposed to the outside of the battery case 30 is vertically bent such that an upper end portion 50A thereof is parallel to the sealing plate 60. The negative electrode terminal member 50 is attached to the attachment hole 64 with the sealing material 70 joined thereto.

The positive electrode terminal member 40 is an elongated metal member extending in the height direction Z. As shown in FIG. 1, a lower end portion of the positive electrode terminal member 40 is connected to the positive electrode current collector exposed portion 21C. The positive electrode terminal member 40 passes through the attachment hole 64 and is exposed to the outside of the battery case 30. The portion of the positive electrode terminal member 40 exposed to the outside of the battery case 30 is vertically bent such that an upper end portion 40A thereof is parallel to the sealing plate 60. The positive electrode terminal member 40 is attached to the attachment hole 64 with the sealing material 70 joined thereto.

The configuration of the lid body 34 disclosed herein will be described below with reference to FIG. 2 on the basis of the configuration on the negative electrode terminal side. FIG. 2 is a cross-sectional view along line II-II in FIG. 1, which is a partial cross-sectional view schematically showing a structure of a cross-section of the lid body 34 disclosed herein including the negative electrode terminal member 50. Also, since the configuration on the positive electrode terminal side can be the same as the configuration on the negative electrode terminal side described below, detailed description thereof will be omitted.

The sealing material 70 is disposed between the negative electrode terminal member 50 and the sealing plate 60 to close the attachment hole 64 in order to insulate the negative electrode terminal member 50 and the sealing plate 60 and maintain the airtightness inside the sealed battery 10. Also, the thermoplastic resin and the inorganic filler used in the sealing material 70 are not limited to one type and may be composed of a plurality of types. Further, the sealing material 70 may contain a material other than the thermoplastic resin and the inorganic filler as long as it does not impair the effects of the present disclosure.

For the thermoplastic resin, a conventional general thermoplastic resin can be used. Although not limited thereto, for example, polyarylene sulfide (PAS) or the like, which has excellent adhesion to a metal, may be used, and polyphenylene sulfide (PPS) may be preferably used.

In the present embodiment, for the inorganic filler contained in the sealing material 70, an inorganic substance having corrosion resistance to the electrolyte is used. Although not limited thereto, for the inorganic filler having corrosion resistance, for example, alumina, potassium titanate, silicon carbide, carbon, alkaline glass, quartz glass or the like can be used. Among these, alumina, potassium titanate, silicon carbide, and carbon, which have particularly high corrosion resistance to the electrolyte, can be preferably used. A shape of the inorganic filler is not particularly limited, and fibrous, scaly, spherical or other shapes can be used.

The corrosion resistance of the inorganic filler to the electrolyte can be evaluated according to a volume change rate before and after immersion after performing the immersion test in the test electrolyte. Specifically, the corrosion resistance of the inorganic filler can be evaluated using the following method.

A test electrolyte that contains 1200 ppm of water and containing 1 M of $LiPF_6$ and having a solvent volume ratio satisfying the relationship of ethylene carbonate:diethyl carbonate:dimethyl carbonate=1:1:1 is prepared. An inorganic filler whose corrosion resistance is to be evaluated is prepared. From the prepared inorganic filler (inorganic filler before immersion), volumes of 30 inorganic fillers are randomly estimated through SEM observation, and an average volume $V_1$ of the inorganic filler before the immersion is calculated. A prepared test electrolyte is adjusted to 65° C. The inorganic filler is immersed in the test electrolyte adjusted to 65° C. for 7 days. The inorganic filler immersed for 7 days (inorganic filler after immersion) is taken out of the test electrolyte. Through SEM observation, volumes of 30 inorganic fillers after immersion are randomly estimated, and an average volume $V_2$ of the inorganic filler after immersion is calculated. $(V_2-V_1)/V_1$ is calculated and used as the volume change rate. In the present specification, an inorganic filler having a volume change rate of 20% or less is defined as the inorganic filler having corrosion resistance.

For the inorganic filler contained in the sealing material 70, an inorganic filler having a small increase in volume before and after immersion in the test electrolyte is preferable. The volume change rate measured using the above method is preferably 20% or less, more preferably 10% or less, and further preferably 1% or less.

In the present embodiment, the sealing material 70 is joined by the anchor effect on a surface (a contact surface 50C) in contact with the negative electrode terminal member 50. Further, the sealing material 70 is also joined by the anchor effect on a surface (a contact surface 60C) in contact with the sealing plate 60.

Specifically, the contact surface 50C on the negative electrode terminal member 50 and the contact surface 60C on the sealing plate 60 are subjected to surface roughening processing to form fine irregularities. The sealing material 70 is joined to the negative electrode terminal member 50 and the sealing plate 60 by the sealing material entering the irregularities. The surface roughening processing can be performed using known physical and/or chemical methods. As a method of surface roughening, a method such as laser processing, sandblasting processing, or anodic oxidation processing is exemplified.

Through injection molding, the sealing material 70 can be joined to the sealing plate 60 and the negative electrode terminal member 50 by the anchor effect and molded in an integrated state. Further, by appropriately setting conditions of the injection molding, the inorganic filler can be oriented with respect to the sealing plate 60 and the negative electrode terminal member 50.

The sealing material 70 can be molded, for example, using the following method.

The thermoplastic resin and the inorganic filler used in the sealing material 70 are melted to prepare a resin for injection molding. A mold in which the sealing plate 60 and the negative electrode terminal member 50 can be disposed and which is formed to conform to a shape of the sealing material 70 is prepared. The sealing plate 60 and the negative electrode terminal member 50 are disposed in the mold. A molten resin for injection molding is poured into the mold under predetermined conditions. The conditions of the injection molding are appropriately adjusted depending on a material of the sealing material 70, dimensions of each member, a shape of the inorganic filler, and the like. For example, it may be performed at a resin temperature of about 250 to 350° C., an injection speed of about 10 to 60 mm/sec, and a holding pressure of about 20 to 100 MPa.

In the embodiment described above, the entire contact surface 50C of the negative electrode terminal member 50 and the contact surface 60C of the sealing plate 60 are joined by the anchor effect, but a range of joining is not limited thereto. The sealing material 70 may be partially joined to the contact surfaces 50C and 60C as long as its joining strength and sealing property are sufficient.

The sealed battery disclosed herein is not limited to the lithium-ion secondary battery described above, and for example, a sodium-ion secondary battery, a magnesium-ion secondary battery, and a lithium-ion capacitor included in a so-called physical battery are also examples of the sealed battery indicated herein. Further, although the present disclosure has been described on the basis of a lithium-ion secondary battery including a wound electrode body having a structure in which a plurality of positive electrode bodies and negative electrode bodies are wound via separators, the electrode body is not limited to such a configuration and may be a so-called laminated electrode body in which a plurality of positive electrode bodies and negative electrode bodies are laminated via separators.

Hereinafter, a preferred embodiment will be described with reference to an example, but the present disclosure is not intended to be limited to such an example.

Here, various inorganic fillers were used to evaluate an effect of the corrosion resistance of the inorganic filler on coldness and heat resistance of the sealed battery. Specifically, first, various inorganic fillers were immersed in the electrolyte to determine the volume change rate, and thus corrosion resistance of each inorganic filler was evaluated. Next, a test sample simulating the lid body of the sealed battery was prepared using these inorganic fillers. In addition, the test sample was immersed in the electrolyte, and then a cooling and heating cycle test and a helium leak test were performed.

Measurement of Volume Change Rate of Inorganic Fillers

Volume change rates of the inorganic fillers listed in Table 1 used in Test sample examples 1 to 11 were measured using the same method as the immersion test in the test electrolyte described above. The results are shown in Table 1.

Preparation of Test Sample

Example 1

PPS and alkaline glass were prepared such that a weight ratio thereof was PPS:alkaline glass=80:20. PPS was melted at 330° C. and mixed with acrylic glass to prepare an injection molding material.

An aluminum test piece having a size of 50 mm×50 mm×3 mm with a 08 mm through hole provided in a center thereof was prepared. One surface of the test piece was subjected to surface roughening processing by laser irradiation.

A mold with which the through hole of the test piece could be closed on the surface of the test piece that had been subjected to the surface roughening processing and an injection-molded body having a diameter of 16 mm×3 mm could be molded at the center of the test piece was prepared. The test piece was placed in the mold.

A 330° C. test molding material was filled in the mold at an injection speed of 50 mm/sec.

When the test molding material was cooled and hardened, the mold was removed to obtain Test sample example 1 in which a molded body having a diameter of 16 mm×3 mm was molded in the test piece. The molded body is molded on one surface of the test sample, and the molded body is not molded on the other surface. Hereinafter, a surface on which the molded body is molded is referred to as a molded surface, and a surface on which the molded body is not molded is referred to as a non-molded surface.

Examples 2 to 11

Test sample examples 2 to 11 were prepared in the same manner as in Test sample example 1 except that the inorganic substances shown in Table 1 were used as the inorganic fillers to be used.

TABLE 1

| Test sample | Inorganic filler | Volume change rate | Cooling and heating cycle resistance |
|---|---|---|---|
| Example 1 | Alkaline glass | 10% | good |
| Example 2 | Quartz glass | 20% | good |
| Example 3 | Alumina | <1% | good |
| Example 4 | Potassium titanate | <1% | good |
| Example 5 | Silicon carbide | <1% | good |
| Example 6 | Carbon | <1% | good |
| Example 7 | E glass | >99% | poor |
| Example 8 | Silicon nitride | 25% | poor |
| Example 9 | Calcium carbonate | >99% | poor |
| Example 10 | Magnesium oxide | 25% | poor |
| Example 11 | Calcium oxide | >99% | poor |

Immersion of Test Sample

Test sample examples 1 to 11 that had been prepared were immersed in the above-mentioned test electrolyte for 3 months.

Cooling and Heating Cycle Test

For Test sample examples 1 to 11 immersed in the test electrolyte, 5500 cooling and heating cycles at −65° C. to 120° C. were performed.

Helium Leak Test

For Test sample examples 1 to 11 after the cooling and heating cycle test, a helium leak test was performed using a helium detector in order to evaluate the sealing property between the test piece and the injection-molded body. Helium was introduced from the non-molded surface side and sucked from the molded surface side so that a differential pressure was 2 atm, and a leak amount of helium was detected from the molded surface side. A case in which the leak amount of helium detected by the helium detector was $1.0 \times 10^{-5}$ (Pa·m$^3$/sec) or more was evaluated as poor, and a case in which it was less than the above value was evaluated as good. The results are shown in Table 1.

As shown in Table 1, in Test sample examples 1 to 6 using the inorganic fillers having volume change rates of 20% or less, the sealing property between the test piece and the injection-molded body was good even after the cooling and heating cycle test. In Test sample examples 7 to 11 using the inorganic fillers having volume change rates of more than 20%, the sealing property between the test piece and the injection-molded body after the cooling and heating cycle test was not good.

By using the inorganic fillers having low volume change rates even when immersed in the electrolyte, such as Test sample examples 1 to 6, as a sealing material for a sealed battery, the sealing property of the sealing material can be maintained for a long period of time.

Although specific examples of the present disclosure have been described in detail above, these are merely examples and do not limit the scope of the claims. The techniques described in the claims include various modifications and changes of the specific examples illustrated above.

What is claimed is:

1. A lid body which is used for a sealed battery including a case body including an opening and accommodating an electrode body, and which closes the opening, the lid body comprising:
    a terminal member;
    a sealing plate including an attachment hole for attaching the terminal member; and
    a sealing material containing a thermoplastic resin and an inorganic filler, wherein the inorganic filler comprises alkaline glass, the sealing material directly contacts the terminal member, and the sealing material has a uniform composition, wherein
    the terminal member is attached to the attachment hole in a state of being joined to the sealing material, and
    as the inorganic filler, an inorganic substance having a volume change rate of 20% or less after being immersed for 7 days in a test electrolyte which is prepared at 65° C., and which contains 1200 ppm of water and 1 M of $LiPF_6$, and moreover in which a volume ratio of a solvent thereof satisfies a relationship of ethylene carbonate:diethyl carbonate:dimethyl carbonate=1:1:1, is used.

2. The lid body according to claim 1, wherein the thermoplastic resin is substantially composed of a polyarylene sulfide resin.

3. The lid body according to claim 1, wherein the inorganic filler further comprises at least one selected from the group consisting of alumina, potassium titanate, silicon carbide and carbon.

4. The lid body according to claim 1, wherein at least a portion of the sealing material is joined to the sealing plate and the terminal by an anchor effect, wherein the anchor effect comprises the sealing material entering fine irregularities in the terminal member.

5. A sealed battery comprising:
    an electrode body including a positive electrode and a negative electrode;
    a case body that includes an opening and accommodates the electrode body; and
    the lid body according to claim 1 that closes the opening.

6. A lid body which is used for a sealed battery including a case body including an opening and accommodating an electrode body, and which closes the opening, the lid body comprising:
    a terminal member having a contact surface with fine irregularities;
    a sealing plate including an attachment hole for attaching the terminal member; and
    a sealing material containing a thermoplastic resin and an inorganic filler, wherein the inorganic filler comprises alkaline glass, the sealing material directly contacts the terminal member, and the sealing material has a uniform composition,
    the terminal member is attached to the attachment hole in a state of being joined to the sealing material, the sealing material enters the fine irregularities, and
    as the inorganic filler, an inorganic substance having a volume change rate of 20% or less after being immersed for 7 days in a test electrolyte which is prepared at 65° C., and which contains 1200 ppm of water and 1 M of $LiPF_6$, and moreover in which a volume ratio of a solvent thereof satisfies a relationship of ethylene carbonate:diethyl carbonate:dimethyl carbonate=1:1:1, is used.

7. The lid body according to claim 6, wherein the sealing material completely fills the fine irregularities.

8. The lid body according to claim 1, wherein the sealing material directly contacts a first surface of the terminal member and a second surface of the terminal member, the first surface of the terminal member is perpendicular to the second surface of the terminal member, the first surface is parallel to a direction in which the sealing plate extends, and the second surface is parallel to a direction extending toward the inside of the battery case body.

9. The lid body according to claim 1, wherein the sealing material covers a portion of an outermost surface of the sealing plate.

10. The lid body according to claim 1, wherein the sealing material directly contacts a first surface of the terminal member and a second surface of the terminal member, the first surface of the terminal member is perpendicular to the second surface of the terminal member, the first surface is parallel to a direction in which the sealing plate extends, and the first surface contacts an upper surface of the sealing material, and the second surface is parallel to a direction extending toward the inside of the battery case body.

11. The lid body according to claim 1, wherein the inorganic filler further comprises at least one selected from the group consisting of potassium titanate, silicon carbide and carbon.

12. The lid body according to claim 1, wherein the sealing material consists of a polyarylene sulfide resin as the thermoplastic resin and the alkaline glass as the inorganic filler.

* * * * *